(12) United States Patent
Milione et al.

(10) Patent No.: US 9,813,158 B2
(45) Date of Patent: Nov. 7, 2017

(54) MULTIMODE ELLIPTICAL CORE OPTICAL DATA TRANSMISSION

(71) Applicant: NEC Laboratories America, Inc., Princeton, NJ (US)

(72) Inventors: Giovanni Milione, Franklin Square, NY (US); Ezra Ip, Plainsboro, NJ (US); Ting Wang, West Windsor, NJ (US)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 15/131,307

(22) Filed: Apr. 18, 2016

(65) Prior Publication Data
US 2017/0214465 A1 Jul. 27, 2017

Related U.S. Application Data

(60) Provisional application No. 62/286,042, filed on Jan. 22, 2016.

(51) Int. Cl.
*H04B 10/00* (2013.01)
*H04B 10/2581* (2013.01)
*H04Q 11/00* (2006.01)
*H04B 10/50* (2013.01)
*H04B 10/40* (2013.01)
*H04B 10/516* (2013.01)
*H04J 14/00* (2006.01)

(52) U.S. Cl.
CPC ......... *H04B 10/2581* (2013.01); *H04B 10/40* (2013.01); *H04B 10/503* (2013.01); *H04B 10/516* (2013.01); *H04J 14/00* (2013.01); *H04Q 11/0005* (2013.01); *H04Q 2011/0015* (2013.01)

(58) Field of Classification Search
CPC .. H04B 10/2581; H04B 10/40; H04B 10/503; H04B 10/516; H04Q 11/0005; H04Q 2011/0015; H04J 14/00
See application file for complete search history.

(56) References Cited

U.S. PATENT DOCUMENTS

| | | | | |
|---|---|---|---|---|
| 3,855,544 A * | 12/1974 | Bowness | ............... | H01S 3/07 356/519 |
| 2005/0025416 A1* | 2/2005 | Hallemeier | ............... | G02B 6/14 385/28 |
| 2009/0296743 A1* | 12/2009 | Islam | ............... | H01S 3/2316 372/3 |
| 2010/0329671 A1* | 12/2010 | Essiambre | ............... | G02B 6/14 398/44 |
| 2011/0243574 A1* | 10/2011 | Essiambre | ......... | G02B 6/29311 398/200 |
| 2012/0224807 A1* | 9/2012 | Winzer | ............... | G02B 6/14 385/28 |

(Continued)

OTHER PUBLICATIONS

D.J. Richardson et al., Space-division multiplexing in optical fibres, Nature Photonics, vol. 7, May 2013.
Nicolas Riesen et al., Few-Mode Elliptical-Core Fiber Data Transmission, IEEE Photonics Technology Letters, vol. 24, No. 5, Mar. 1, 2012.
Neng Bai, et al., Mode-division multiplexed transmission with inline few-mode fiber amplifier, Optics Express, vol. 20, No. 3, Jan. 30, 2012.

(Continued)

*Primary Examiner* — Danny Leung (74) *Attorney, Agent, or Firm* — Joseph Kolodka (57) ABSTRACT

Methods and system for transmitting data includes converting multiple optical beams to distinct respective spatial modes. Data is modulated onto each of the optical beams. The optical beams are combined into a single transmission beam. The transmission beam is launched onto a multimode optical fiber having an elliptical core.

7 Claims, 8 Drawing Sheets

(56) References Cited

U.S. PATENT DOCUMENTS

| | | | | |
|---|---|---|---|---|
| 2012/0251105 A1* | 10/2012 | Kwok | ............... | G02B 6/0288 |
| | | | | 398/44 |
| 2014/0140694 A1* | 5/2014 | Zhou | ............... | H04J 14/04 |
| | | | | 398/44 |
| 2014/0209798 A1* | 7/2014 | Woodward | ............... | G02B 6/04 |
| | | | | 250/227.28 |
| 2015/0098697 A1* | 4/2015 | Marom | ............... | H04J 14/04 |
| | | | | 398/44 |
| 2016/0085024 A1* | 3/2016 | Fontaine | ............... | G02B 6/04 |
| | | | | 398/65 |
| 2016/0202142 A1* | 7/2016 | Wang | ............... | G01M 11/3109 |
| | | | | 356/73.1 |
| 2016/0233964 A1* | 8/2016 | Frohlich | ............... | H04B 10/85 |
| 2016/0234018 A1* | 8/2016 | Frohlich | ............... | H04B 10/70 |

OTHER PUBLICATIONS

Ezra Ip, et al., SDM transmission of real-time 10GbE traffic using commercial SFP+ transceivers over 0.5km elliptical-core few-mode fiber, Optics Express 17120, vol. 23, No. 13, Jun. 29, 2015.

Tetsuya Hayashi, et al., 125-μm-Cladding 8-Core Multi-Core Fiber Realizing Ultra-High-Density Cable Suitable for O-Band Short-Reach Optical Interconnects, Optical Fiber Communications Conference and Exhibition (OFC), Mar. 22-26, 2015.

Nenad Bozinovic et al., Terabit-Scale Orbital Angular Momentum Mode Division Multiplexing in Fibers, Scinece vol. 340, Jun. 28, 2013.

Bahaa E. A. Saleh et al., Fundamentals of Photonics, 2nd Edition, Mar. 2007.

\* cited by examiner

MULTIMODE ELLIPTICAL CORE OPTICAL DATA TRANSMISSION

RELATED APPLICATION INFORMATION

This application claims priority to U.S. Provisional Application No. 62/286,042 filed on Jan. 22, 2016, incorporated herein by reference in its entirety.

BACKGROUND

Technical Field

The present invention relates to optical communications and, more particularly, to the use of space division multiplexing in elliptical multimode fibers.

Description of the Related Art

As the demand for data bandwidth has increased, data transmission technologies have struggled to keep up. Current technologies stretch into transmission rates in the 100 Gbit/s range, with 400 Gbit/s and greater speeds on the horizon.

There are several technologies employed to increase the transmission rate in optical data transmissions. One example is coherent detection, which enables the use of several different kinds of modulation and multiplexing. However, transmission formats that rely on coherent detection necessitate the use of coherent transmitters and receivers whose cost and complexity may be prohibitive. One application for 100 Gbit/s and 400 Gbit/s optical fiber communications is inter- and intra-data-center connections (e.g., distances greater than 500 m and less than 100 km).

Other approaches include simple increases in the symbol speed and number of amplitude levels, but these quantities cannot be increased indefinitely. In another approach, multiple fibers may be used to multiply the transmission rate of a single fiber. However, this provides an obvious increase in the expense of transceivers, as an additional transponder will be needed for each fiber. Similarly, wavelength division multiplexing puts multiple wavelengths of light onto a single fiber but necessitates the use of multiple different light sources. In another approach, the two polarizations of a standard single mode optical fiber are used to double the data speed of an optical fiber. However, this can involve costly and complex digital signal processing, such as "multiple-input-multiple-output."

SUMMARY

A method for transmitting data includes converting each of a plurality of optical beams to distinct respective spatial modes. Data is modulated onto each of the plurality of optical beams. The plurality of optical beams are combined into a single transmission beam. The transmission beam is launched onto a multimode optical fiber having an elliptical core.

A method for receiving data includes receiving a transmission beam from a multimode optical fiber having an elliptical core. The transmission beam is split into a plurality of optical beams, each having a distinct respective spatial mode. The plurality of optical beams are converted to a plurality of respective electrical signals. The plurality of electrical signals are demodulated to extract respective data from each of the plurality of electrical signals.

An optical transceiver includes an optical transmitter configured to launch a first transmission beam onto a multimode optical fiber having an elliptical core, and an optical receiver configured to receive a second transmission beam from a multimode optical fiber having an elliptical core. The optical transmitter includes a mode converter configured to convert each of a plurality of optical beams to distinct respective spatial modes, a modulator configured to modulate date onto each of the plurality of optical beams, and an optical combiner configured to combine the plurality of optical beams into the first transmission beam. The optical receiver includes a mode de-converter configured to split the second transmission beam into a plurality of optical beams, each having a distinct respective spatial mode, a plurality of sensors, each configured to convert a respective optical beam to an electrical signal, and a demodulator configured to demodulate the plurality of electrical signals to extract respective data from each of the plurality of electrical signals.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

In accordance with the present principles, systems and methods are provided for space division multiplexing on elliptical-core optical fibers. In particular, multiple spatial modes are transmitted on a single optical fiber. Whereas circular-core optical fibers generally may need coherent detection, polarization diversity, and digital signal processing, such as "multiple input multiple output," when employing space division multiplexing, the use of elliptical-core fibers in the present embodiments does not necessitate coherent detection or polarization diversity and removes mode ambiguity, removing the need for multiple input multiple output digital signal processing. Hermite-Gaussian modes (i.e., transverse electric-magnetic modes) may be used.

In particular, N Hermite-Gaussian modes are used on a multimode elliptical-core optical fiber are used to provide N distinct spatial channels to transmit N optical signals. The N Hermite-Gaussian modes replace N optical fibers, thereby increasing the data transmission rate of each optical fiber while reducing the number of optical fibers being used and avoiding the need for digital signal processing, such as, multiple-input-multiple-output (MIMO) digital signal processing (DSP). The Hermite-Gaussian modes correspond to both diameters of the elliptical core of the optical fiber.

Figure 1:
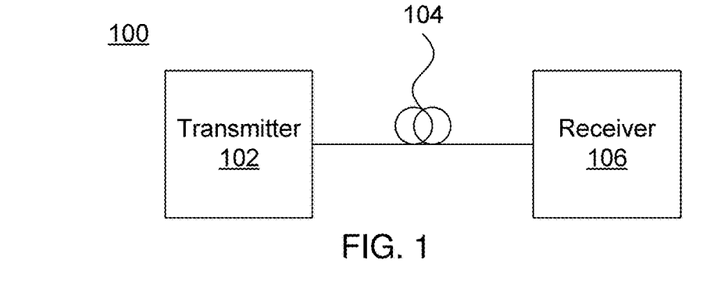
FIG. 1 is a block diagram of an optical communications system in accordance with the present principles.

Referring now in detail to the figures in which like numerals represent the same or similar elements and initially to FIG. 1, an optical transmission system 100 is shown. The transmission system includes a transmitter 102, a multimode elliptical-core optical fiber 104, and a receiver 106. The transmitter 102 transmits N optical signals at a given wavelength on the fiber 104, the N optical signals occupying distinct Hermite-Gaussian modes. The receiver 106 demodulates the N optical signals into respective bitstreams.

It should recognized that the system of FIG. 1 shows only one transmission direction—from transmitter 102 to receiver 106. In most practical applications, there will be both a transmitter 102 and a receiver 106 at each end, in communication with their counterparts over distinct fibers 104 or over a same fiber. The transmitter and receiver at one location may be combined into a single transceiver.

Figure 2:
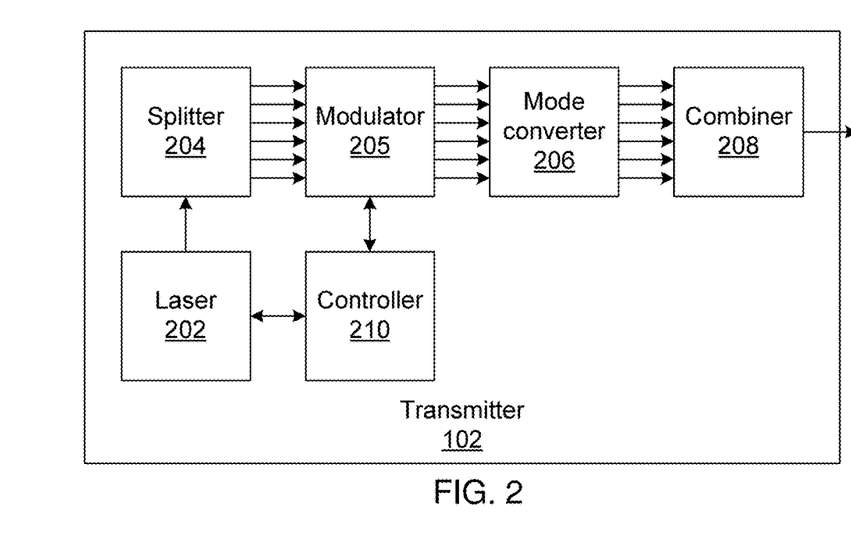
FIG. 2 is a block diagram of an optical transmitter in accordance with the present principles.

Referring now to FIG. 2, additional detail on the transmitter 102 is shown. A laser 202 generates a beam of light at a transmission wavelength. The beam is split into N separate beams by optical splitter 204. In an alternative embodiment, N different lasers may be used instead of the single laser 202 and splitter 204 to generate the N separate beams. Each laser 202 may be any appropriate laser light source including, e.g., a vertical cavity surface emitting laser or a small-form-factor-plus transceiver.

In one embodiment, a modulator 205 modulates a bitstream onto each of the N beams. This modulation may be any appropriate modulation scheme including, e.g., amplitude modulation. A mode converter 206 converts each modulated beam to a particular Hermite-Gaussian mode. It should be understood that mode converter 206 may alternatively be positioned before the modulator 205. The mode converter 206 may be any appropriate device that converts an incoming light beam to an output beam that has a specific Hermite-Gaussian mode and may include, for example, a diffractive holographic element, such as a liquid crystal on silicon spatial light modulator, a digital micromirror device, an all-glass device such as a three-dimensional glass waveguide, an all-fiber device such as a photonic lantern, etc. Notably, the mode crosstalk of the Hermite-Gaussian modes does not depend on polarization, such that polarization adjustment is not needed during mode conversion.

The N different signals, each carrying a modulated data signal at a specific spatial mode, are combined into a single beam using combiner 208 and are launched into the input of multimode elliptical-core optical fiber 104. The modes used by mode converter 206 correspond to both diameters of the elliptical core of the fiber 104, as described in greater detail below. Launching the signal is accomplished by directly connecting he output of the combiner 308 to the input of the fiber 104 or, alternatively, by using additional optics such as a lens or several lenses.

A transmitter controller 210 interfaces with the laser 202 and modulator 205. The controller 210 controls the operation of the laser 202 and furthermore determines how the modulator 205 modulates data onto the beams. In particular, the transmitter controller 210 provides the bitstream to the modulator that is used to modulate information onto the laser beams.

Figure 3:
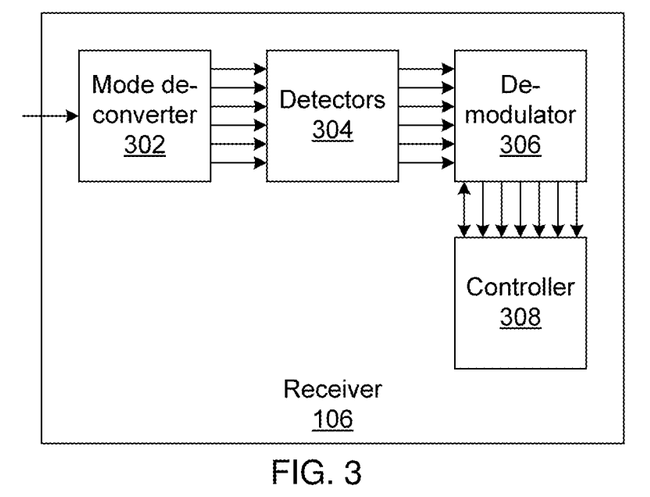
FIG. 3 is a block diagram of an optical receiver in accordance with the present principles.

Referring now to FIG. 3, additional detail on the receiver 106 is shown. A multimode light beam is received from the multimode elliptical-core optical fiber 104 by mode de-converter 302. The mode de-converter 302 splits the multimode input light beam into N separate beams, each at a specific spatial mode. The mode de-converter 302 may therefore include a splitter and a set of N mode filters or may, alternatively, perform mode de-conversion in such a fashion as to separate the N modes. The mode de-converter 302 may include a diffractive holographic optical element, such as a liquid crystal on silicon spatial light modulator, a digital micromirror device, and all-glass device such as a three-dimensional glass waveguide, or an all-fiber device such as a photonic lantern.

A receiver controller 308 controls the operation of the demodulator. In particular, the receiver controller 308 determines how the demodulator recognizes data in the received optical signals and extracts information from them. The demodulator 306 provides its output bitstreams to the receiver controller 308.

The N outputs of the mode de-converter are received by N detectors 304 that convert the optical signal to an electrical signal. The detectors 304 may include, for example, a set of N photodetectors. Demodulators 306 then convert the modulated electrical signal into a set of N output bitstreams. No DSP is needed to mitigate mode crosstalk in recovering the signals.

Figure 4:
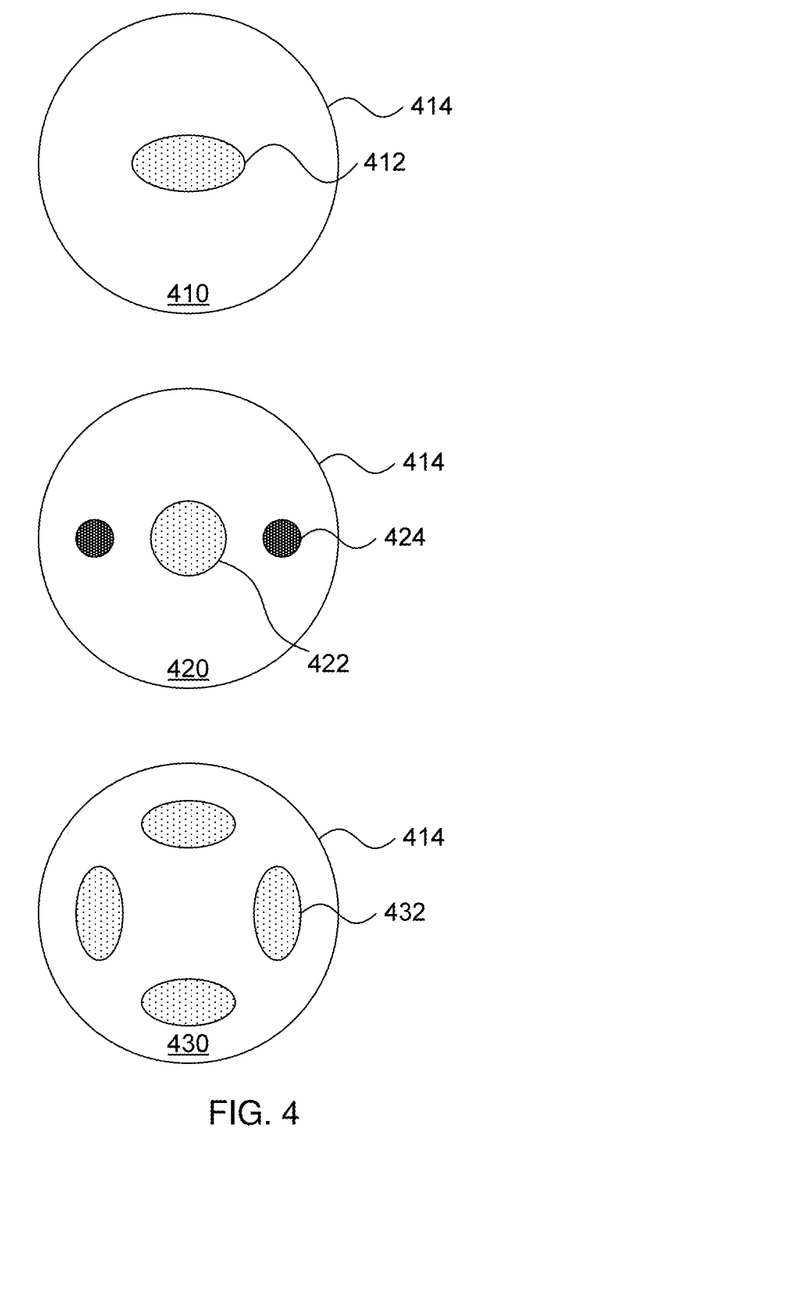
FIG. 4 is a diagram of elliptical-core fiber cross-sections in accordance with the present principles.

Referring now to FIG. 4, cross-sections of a set of different multimode elliptical-core optical fibers are shown. A first cross-section 410 shows a fiber core 412 surrounded by a fiber cladding 414. In this embodiment, the fiber core 412 has an elliptical cross-section. An ellipse has two diameters, a greater diameter a and a lesser diameter b, and these diameters are reflected in two separate waists for a beam that is transmitted in the fiber core 412. The fiber core 412 is formed from a material that is transparent at a transmission wavelength. The fiber cladding 414 has an index of refraction that is different from the index of refraction of the fiber core 412, such that light transmitted in the fiber core 412 at the transmission wavelength has total internal reflection.

In one exemplary embodiment, the elliptical-core optical fiber 104 in the configuration shown in cross-section 410 may have a smaller elliptical core diameter of about 15 μm and a larger elliptical core diameter of about 20 μm. Such a fiber supports six Hermite-Gaussian modes at a wavelength of about 980 nm. At 1550 nm, the same fiber supports two Hermite-Gaussian modes. Thus the dimensions of the fiber core 412 are dictated by a number of desired Hermite-Gaussian modes and a wavelength of light to be transmitted.

A second cross-section 420 shows a circular fiber core 422 that is stressed by asymmetric stresses 424. The stresses 424 can affect the transmission of light in the fiber core 422 in a manner similar the elliptical shape shown in cross-section 410. In a further alternative, the elliptical effect can be created using asymmetrical doping. It should be understood that other asymmetries may be used instead of an ellipse. The term "elliptical-core" as used herein is defined to include cores having a physical elliptical cross section, as shown in 410, as well as cores that have elliptical transmission characteristics, as shown in 420.

A third cross-section 430 shows a multi-core fiber with multiple elliptical fiber cores 432. Similar to the use of multiple distinct fibers to increase the special channels, each fiber core 432 can carry separate modes to increase spatial multiplexing.

In each of the above-described fibers, the spatial modes of the elliptical-core optical fiber are Hermite-Gaussian modes. The electrical field of Hermite-Gaussian modes is defined by:

$$HG_{mn}(x, y) = H_m\left(\frac{x}{w_x}\right)H_n\left(\frac{y}{w_y}\right)e^{\left(-\frac{x^2}{w_x^2}\right)}e^{\left(-\frac{y^2}{w_x^2}\right)}$$

where m and n are mode indices, x and y are rectangular coordinates measured in the cross section of a fiber core such as elliptical fiber core 412, $H_m$ and $H_n$ are Hermite polynomials, and $w_x$ and $w_y$ are the Hermite-Gaussian modes' waists in the x- and y-directions respectively. In an elliptical core fiber, the waists $w_x$ and $w_y$ are not equal to one another. In one exemplary embodiment, $w_x=1.5w_y$. The beam waist may also be referred to as the "mode field diameter."

The elliptical core fiber has one mode field diameter along the small diameter of the elliptical core and another mode field diameter along the larger diameter of the elliptical core. The different Hermite-Gaussian modes have significantly different propagation constants in elliptical-core fibers, making them resistant to crosstalk. The term "propagation constant" can also be under stood via "rays" in the fiber. A mode in a fiber is a collection of light rays that travel together along the fiber. The fiber acts as a waveguide for the light rays. The light rays for each mode are guided in the fiber because they reflect back and forth off of the core-cladding boundary (the edge of the waveguide) via total internal reflection. The rays of each mode reflect off of the core-cladding boundary at a unique angle. Every mode has a different "reflection" angle from the other modes, and that angle corresponds to the propagation constant. Sometimes, a parameter referred to as "effective index" also describes this "reflection." In the elliptical fiber, the reflection angles for each mode are very different from one another. Mode crosstalk is equivalent to changing the reflection angle of one mode to be that of another mode. For example, the $HG_{01}$ mode has a reflection angle predominantly along the plane of the smaller diameter of the elliptical fiber. The $HG_{10}$ mode has a reflection angle predominantly along the plane of the larger diameter of the elliptical fiber. To cause crosstalk between the $HG_{01}$ and $HG_{10}$ modes, the rays of the $HG_{01}$ mode would need to reflect off of a perpendicular plane. However, such reflections are rare, even when the elliptical fiber is bent into small diameter loops.

The elliptical core of the fiber 104 may be a "few-mode" or a "multimode" core. A few-mode fiber can carry, for example, between one and fifteen different modes, whereas a multimode fiber can carry more than fifteen modes. In an exemplary embodiment, a multimode fiber may have a core diameter of about 50 μm for 1550 nm wavelength light.

Figure 5:
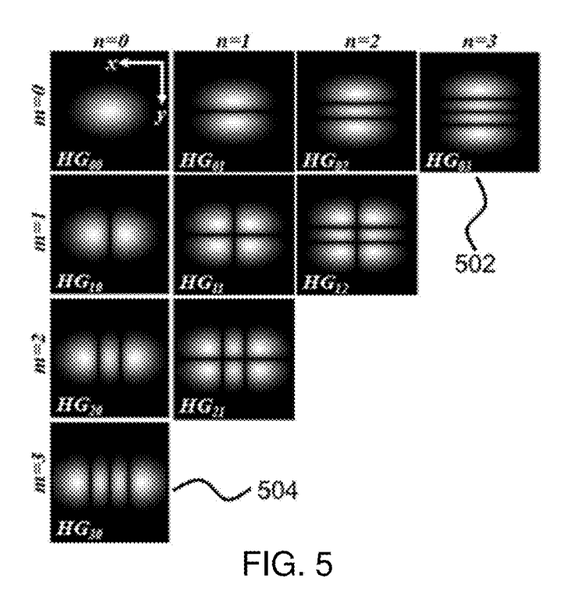
FIG. 5 is a diagram of Hermite-Gaussian modes in an elliptical-core fiber in accordance with the present principles.

Referring now to FIG. 5, a set of theoretical intensity images of Hermite-Gaussian modes are shown for the case of $w_x=1.5w_y$. A given Hermite-Gaussian mode can correspond to either of the diameters of the elliptical fiber core, but it should be immediately apparent that this information can be recovered as, for example, $HG_{03}$ 502 is visually distinguishable from $HG_{30}$ 504 due to the elliptical nature of the channel.

The present embodiments provide transmissions that are very robust against mode crosstalk. Mode crosstalk arises due to mode coupling, which is the exchange of power between modes as they propagate through multimode optical fiber 104. Mode crosstalk measures the cumulative power that is exchanged at the fiber 104. In one experimental measurement of mode crosstalk along a 1 km multimode elliptical-core optical fiber, less than −14 dB of crosstalk was measured between any two Hermite-Gaussian modes.

Mode crosstalk can also arise due to rotations in the elliptical core itself. For example, if rotated by 90°, the $HG_{10}$ mode resembles the $HG_{01}$ mode. This can be avoided by rotating the transmitted signal relative to the fiber 104, for example physically by rotating the mode converter 206 relative to the fiber 104 or digitally by using a liquid crystal on silicon spatial light modulator. Tip/tilt misalignments can similarly cause mode crosstalk. Tip/tilt is defined as the displacement of the Hermite-Gaussian modes relative to the elliptical core. The tip/tilt of the transmitted signal is therefore also adjusted to minimize mode crosstalk. Mode crosstalk is minimized even when the elliptical-core optical fiber 104 has multiple 1 cm diameter bends.

Figure 6:
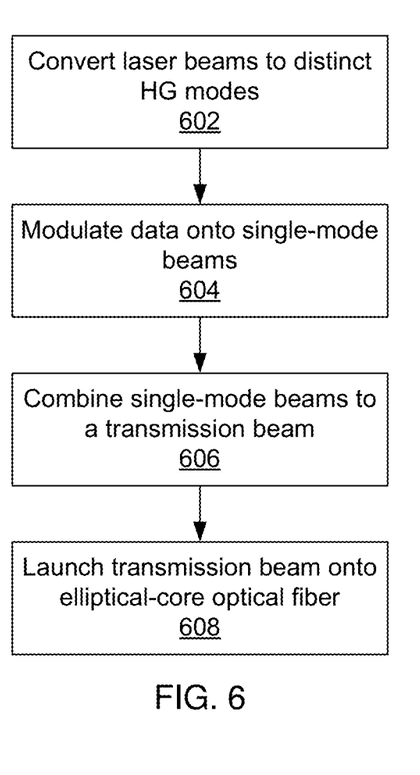
FIG. 6 is a block/flow diagram of a method for optical transmission in accordance with the present principles.

Referring now to FIG. 6, a method of transmitting information is shown. Block 602 converts a set of laser beams to distinctive respective Hermite-Gaussian modes. It should be noted that the laser beams may be generated by a single laser 202 and split by splitter 204 or may, alternatively, be generated by multiple separate lasers. Block 604 modulates data onto the respective laser beams by any appropriate modulation process including, e.g., amplitude modulation. Block 606 combines the single-mode beams into a single transmission beam using, e.g., an optical combiner 208 and block 608 launches the transmission beam onto the multimode elliptical-core optical fiber 104.

Figure 7:
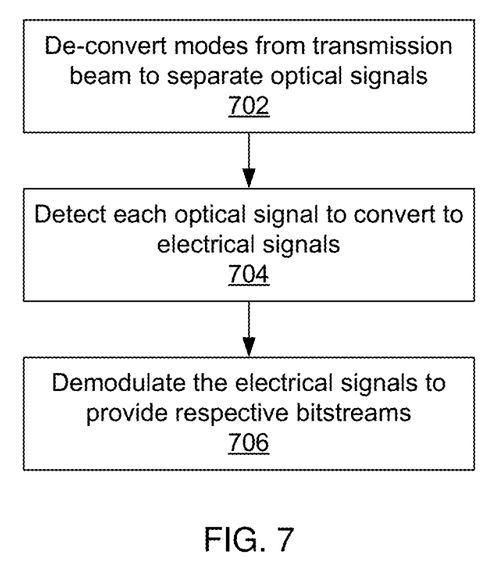
FIG. 7 is a block/flow diagram of a method for optical reception in accordance with the present principles.

Referring now to FIG. 7, a method of receiving information is shown. Block 702 de-converts modes from an optical transmission beam. Block 702 splits the transmission beams into multiple optical signals, each corresponding to a respective Hermite-Gaussian mode. Block 704 detects the optical signals at respective detectors 304, which convert the optical signals into corresponding electrical signals. Block 706 then demodulates the electrical signals to produce a set of bitstreams.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 8:
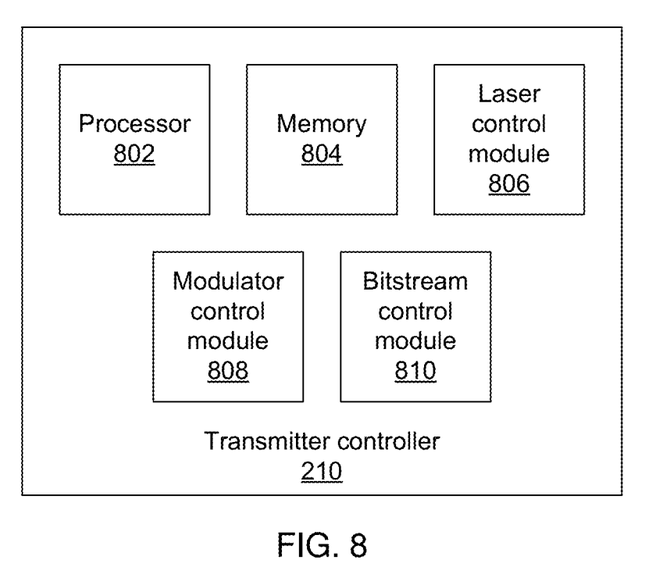
FIG. 8 is a block diagram of a transmitter controller in accordance with the present principles.

Referring now to FIG. 8, additional detail on the transmitter controller 210 is shown. The transmitter controller 210 includes a hardware processor 802 and memory 804. In addition, the transmitter controller 210 includes one or more functional modules that, in one exemplary embodiment, may be implemented as software that is stored in memory 804 and executed by processor 802. In an alternative embodiment, the functional modules may be implemented as one or more discrete hardware components in the form of, e.g., application-specific integrated chips or field-programmable gate arrays.

For example, the transmitter controller includes laser control module 806. The laser control module interfaces with laser 202 to control its power, wavelength, and any other tunable parameters. A modulator control module 808 interfaces with modulator 205 to set any modulation parameters (such as, e.g., modulation type, modulation constellation, etc.). A bitstream control module 810 accepts a data input from any appropriate data source and packages the data input into one or more sets of bitstreams. The bitstream control module 810 then provides these bitstreams to modulator 205, while modulator control module 808 directs the modulator 205 to modulate the bitstreams onto respective optical signals.

Figure 9:
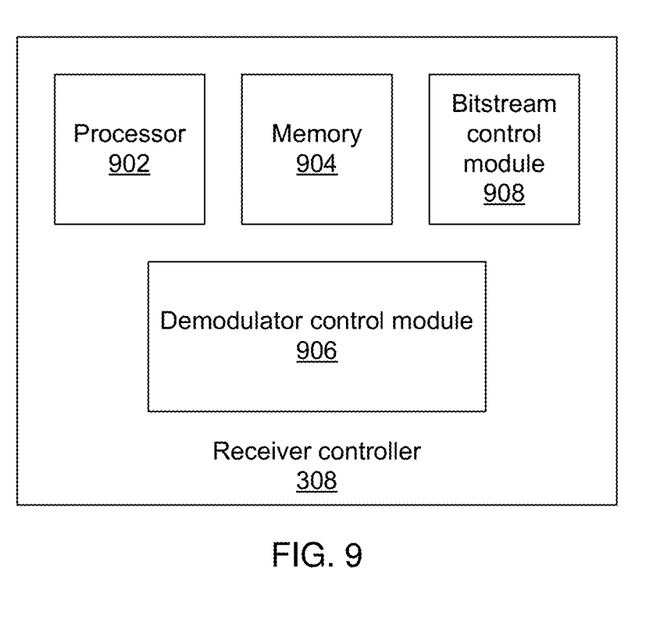
FIG. 9 is a block diagram of a receiver controller in accordance with the present principles.

Referring now to FIG. 9, additional detail on the receiver controller 308 is shown. The transmitter controller 308 includes a hardware processor 902 and memory 904. In addition, the transmitter controller 308 includes one or more functional modules that, in one exemplary embodiment, may be implemented as software that is stored in memory 904 and executed by processor 902. In an alternative embodiment, the functional modules may be implemented as one or more discrete hardware components in the form of, e.g., application-specific integrated chips or field-programmable gate arrays.

For example, the transmitter controller 308 includes a demodulator control module 906. The demodulator control module 906 interfaces with demodulator 306 to set any modulation parameters (such as, e.g., modulation type, modulation constellation, etc.). A bitstream control module 908 receives demodulated bitstreams from the demodulator 306 and assembles them into an output data stream.

Figure 10:
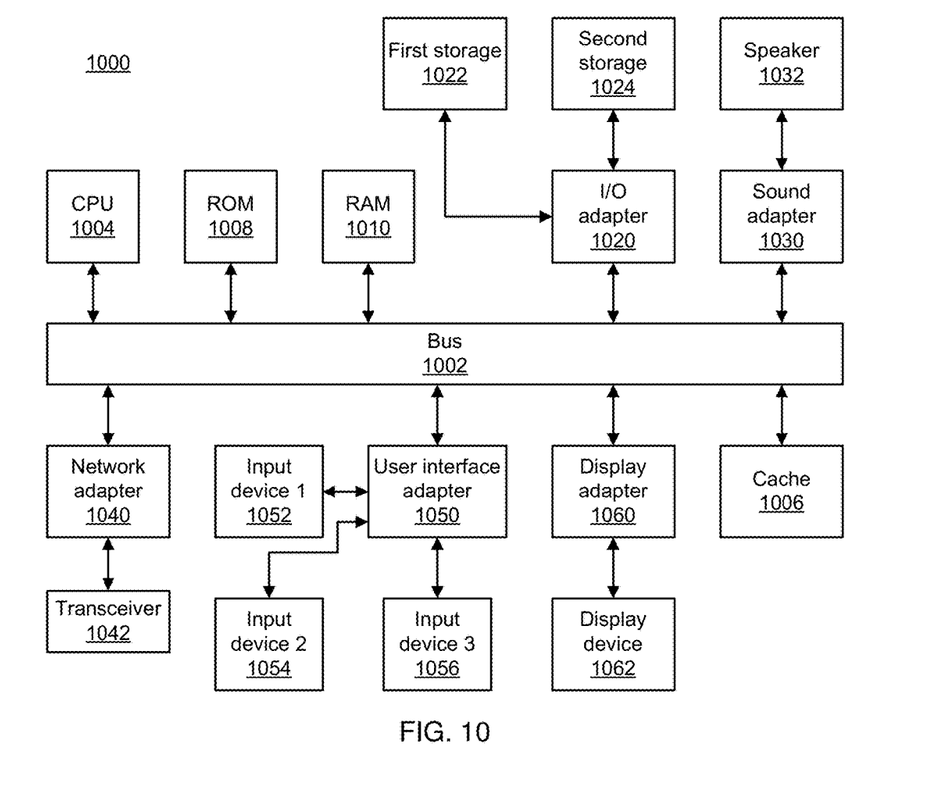
FIG. 10 is a block diagram of a processing system in accordance with the present principles.

Referring now to FIG. 10, an exemplary processing system 1000 is shown which may represent the transmitter 102 or the receiver 106. The processing system 1000 includes at least one processor (CPU) 1004 operatively coupled to other components via a system bus 1002. A cache 1006, a Read Only Memory (ROM) 1008, a Random Access Memory (RAM) 1010, an input/output (I/O) adapter 1020, a sound adapter 1030, a network adapter 1040, a user interface adapter 1050, and a display adapter 1060, are operatively coupled to the system bus 1002.

A first storage device 1022 and a second storage device 1024 are operatively coupled to system bus 1002 by the I/O adapter 1020. The storage devices 1022 and 1024 can be any of a disk storage device (e.g., a magnetic or optical disk storage device), a solid state magnetic device, and so forth. The storage devices 1022 and 1024 can be the same type of storage device or different types of storage devices.

A speaker 1032 is operatively coupled to system bus 1002 by the sound adapter 1030. A transceiver 1042 is operatively coupled to system bus 1002 by network adapter 1040. A display device 1062 is operatively coupled to system bus 1002 by display adapter 1060.

A first user input device 1052, a second user input device 1054, and a third user input device 1056 are operatively coupled to system bus 1002 by user interface adapter 1050. The user input devices 1052, 1054, and 1056 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 1052, 1054, and 1056 can be the same type of user input device or different types of user input devices. The user input devices 1052, 1054, and 1056 are used to input and output information to and from system 1000.

Of course, the processing system 1000 may also include other elements (not shown), as readily contemplated by one of skill in the art, as well as omit certain elements. For example, various other input devices and/or output devices can be included in processing system 1000, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 1000 are readily contemplated by one of ordinary skill in the art given the teachings of the present principles provided herein.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. An optical transceiver, comprising:
an optical transmitter configured to launch a first transmission beam onto a multimode optical fiber, having an elliptical core, without splitting the first transmission beam into distinct polarizations, said optical transmitter comprising:

a mode converter configured to convert each of a plurality of optical beams to distinct respective spatial modes;

a modulator configured to modulate date onto each of the plurality of optical beams; and an optical combiner configured to combine the plurality of optical beams into the first transmission beam; and an optical receiver configured to receive a second transmission beam from a multimode optical fiber, having an elliptical core, without detecting distinct polarizations in the second transmission beam, said optical receiver comprising:

a mode de-converter configured to split the second transmission beam into a plurality of optical beams, each having a distinct respective spatial mode;

a plurality of sensors, each configured to convert a respective optical beam to an electrical signal; and a demodulator configured to demodulate the plurality of electrical signals to extract respective data from each of the plurality of electrical signals.

2. The transceiver of claim 1, wherein the spatial modes are respective Hermite-Gaussian modes.

3. The transceiver of claim 1, wherein the mode converter comprises one or more of a diffractive holographic element, a digital micromirror device, a three-dimensional glass waveguide, and a photonic lantern.

4. The transceiver of claim 1, wherein the transmitter further comprises a single laser and an optical splitter configured to generate the plurality of optical beams.

5. The transceiver of claim 1, wherein the transmitter further comprises a plurality of lasers each configured to generate a respective one of the plurality of optical beams.

6. The transceiver of claim 1, wherein the mode de-converter further comprises one or more of a diffractive holographic element, a digital micromirror device, a three-dimensional glass waveguide, and a photonic lantern.

7. The transceiver of claim 1, wherein each of the plurality of sensors comprises a respective photodetector.

* * * * *